United States Patent [19]

Kimura

[11] 4,354,204
[45] Oct. 12, 1982

[54] AUTOMATIC FOCUSING CONTROL DEVICE

[76] Inventor: Kenji Kimura, 2951 Ishikawa-cho, Hachioji City, Tokyo, Japan

[21] Appl. No.: 235,085

[22] Filed: Feb. 17, 1981

[30] Foreign Application Priority Data

Feb. 18, 1980 [JP] Japan .................................. 55-19456

[51] Int. Cl.³ ............................................ H04N 5/26
[52] U.S. Cl. .................................................. 358/227
[58] Field of Search ....................... 358/227; 352/140; 354/25

[56] References Cited

U.S. PATENT DOCUMENTS 3,617,633 11/1971 Barr et al. ........................... 358/227

FOREIGN PATENT DOCUMENTS 52-57825 5/1977 Japan ..................................... 354/25

Primary Examiner—John C. Martin
Attorney, Agent, or Firm—Toren, McGeady and Stanger

[57] ABSTRACT

An automatic focusing control system used for a television camera is disclosed. The control system comprises an optical system, means for modulating a focal length by a modulating signal, means for sensing an output signal corresponding to the focal length from an image signal obtained from the modulating means, means for sensing a focusing error signal from the output signal and the modulating signal, and means for controlling or adjusting the focal length and superimposing the error signal upon the modulating signal.

5 Claims, 11 Drawing Figures

AUTOMATIC FOCUSING CONTROL DEVICE

BACKGROUND OF THE INVENTION

The present invention relates to an automatic focusing control system used for cameras, such as television cameras.

In case of photographing an object by for example, a television camera, in order to obtain a clear image constantly, it is important to adjust a focal length of the camera under the best condition according to the movement of an object.

However, if the focal length is adjusted every time when the object moves, it is disadvantageous because much troublesome time is taken, a precise focal plane or position cannot be obtained, and the image in such a case becomes indistinct.

SUMMARY OF THE INVENTION

An object of the present invention is to eliminate the above described disadvantages.

Another object of the present invention is to provide an automatic focusing control system which can automatically control a focal plane or position to the best position.

According to the present invention there is provided an automatic focusing control system comprising an optical system, means for modulating a focal length by a modulating signal, means for sensing an output signal corresponding to the focal length from an image signal obtained from the modulating means, means for sensing a focusing error signal from the output signal and the modulating signal, and means for controlling adjusting the focal length by superimposing the error signal upon the modulating signal. The means for modulating a focal length by modulating signal is mechanical means for rotatably driving the optical system by an electric motor. The system also comprises means for sensing the best focal length by the focusing error signal and stopping control of the focal length. The system further comprises means for carrying out the control of focal length to a part of the image signal. The optical system is a lens assembly of a camera.

DESCRIPTION OF THE PREFERRED EMBODIMENT

Figure 1:
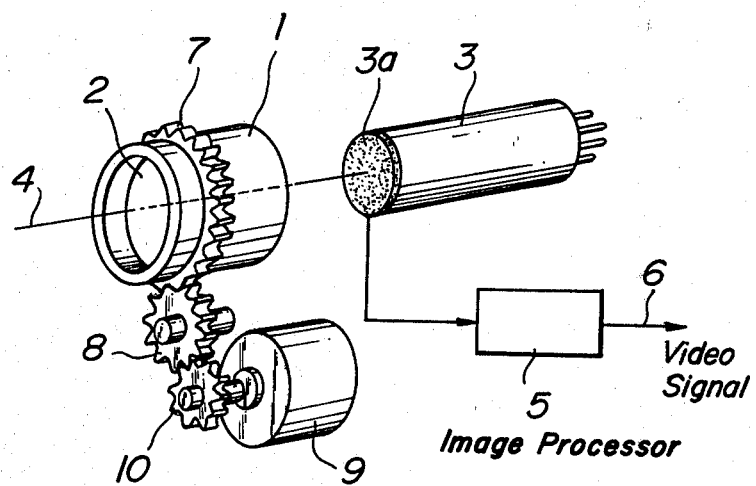
FIG. 1 is a perspective view showing the mechanical construction of one embodiment of an automatic focusing control system according to the present invention.

Referring now to the drawings, wherein same reference characters designate same corresponding parts throughout the several views, FIG. 1 shows an embodiment of a mechanical construction of an automatic focusing control system according to the present invention. Reference numeral 1 is an optical system for example a lens assembly of a camera, such as a television camera, a camera tube 3 is arranged on an optical axis of a lens 2 of the assembly 1, and an input or incident light 4 arrived through the lens 2 is imaged or focused on a target 3a of the camera tube 3. The target 3a is connected to an image processor 5, an output signal from the target 3a is treated and supplied to the output side thereof as an image signal 6. In this case, a deflection circuit or the like necessary to the camera tube 3 is omitted, for clearness.

The peripheral surface of the assembly 1 is provided with a gear 7, the gear 7 is meshed with a gear 10 provided in a rotating shaft of a d.c. reversible motor 9 through a gear 8 and the assembly 1 is rotated by rotating the motor 9 so as to control a focal length.

An electric circuit of the automatic focusing control system according to the present invention will be explained with reference to FIG. 2. Reference numeral 11 is an analog gate to which the aforementioned image signal 6 is received. The analog gate 11 is connected to a differentiating circuit 12, a detector circuit 13, a voltage amplifier 14, a band-pass filter 15 and a sampling and hold circuit 16 in a sequence. The sampling and hold circuit 16 is connected to an R terminal of a flip-flop 18 through a level sensor 17 and further connected to one input terminal of a mixer 19. The other input terminal of the mixer 19 is connected to an oscillator 21 through a d.c. component elimination circuit 20. The oscillator 21 is also connected to the sampling and hold circuit 16 through a sampling pulse generator 23.

An output terminal of the mixer 19 is further connected to the aforementioned d.c. reversible motor 9 through a current amplifier 24 and grounded through a transistor 25. The transistor 25 has a base connected to a $\overline{Q}$ terminal of the flip-flop 18 through a resistor 26. The flip-flop 18 has an S terminal connected to a switch 27.

Reference numeral 28 is a vertical synchronizing signal separator, and reference numeral 29 is a horizontal synchronizing signal separator. These signal separators 28 and 29 receive a composite synchronizing signal 30. These signals separators 28 and 29 are also connected to an AND gate 33 through window pulse generators 31 and 32 respectively. The AND gate 33 is connected to the analog gate 11 through a switch 34.

An operation of the system constructed as described above will be explained as follows. In the first place, in FIG. 1, when the incident light 4 from an object (not shown) is focused or imaged on the target 3a of the camera tube 3 through the lens 2, an output of the target 3a is signal-treated by the image processor 5 and supplied to its output as the image signal 6. The image signal 6 in this case does not contain composite synchronizing signals (vertical synchronizing signal and horizontal synchronizing signal) and has a frequency component fluctuated by focusing change of the optical system. That is, if the focus of the input light 4 is imaged on the light-receiving surface, i.e., target 3a, under the best condition, an image thus formed becomes clear, and if not so, the image becomes unclear, so that if the image is clear, a high frequency component becomes increased, while the image is unclear, a low frequency component becomes increased, and thus the high frequency component is relatively decreased.

Figure 3:
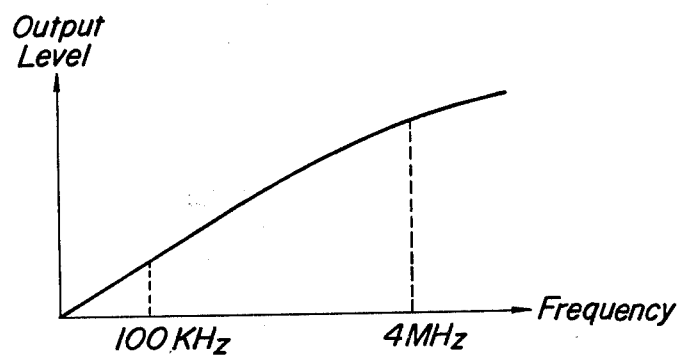
FIG. 3 is a waveform diagram showing a frequency characteristic of a differentiating circuit used in the circuit shown in FIG. 2.
Figure 4:
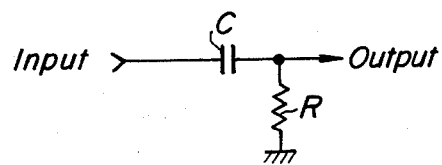
FIG. 4 is a circuit diagram showing the construction of the differentiating circuit.

The image signal 6 is supplied to the differentiating circuit 12 through the analog gate 11. In this case, the analog gate 11 is under the normally conductive or open condition. Moreover, the differentiating circuit 12 has a frequency characteristic as shown in FIG. 3, and consists of a C, R circuit as shown in FIG. 4, so that the differentiating circuit 12 varies its output level by the degree of focus and the maximum output voltage of the circuit 12 is produced under the best focusing condition.

Figure 5:
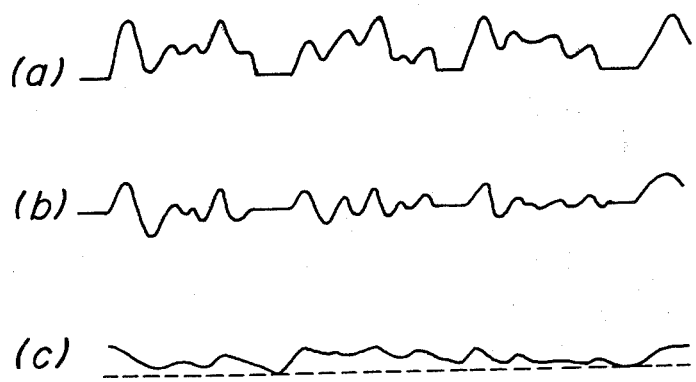
FIG. 5 is a waveform diagram showing the operations of the differentiating circuit and a detector circuit used in the circuit shown in FIG. 2.
Figure 6:
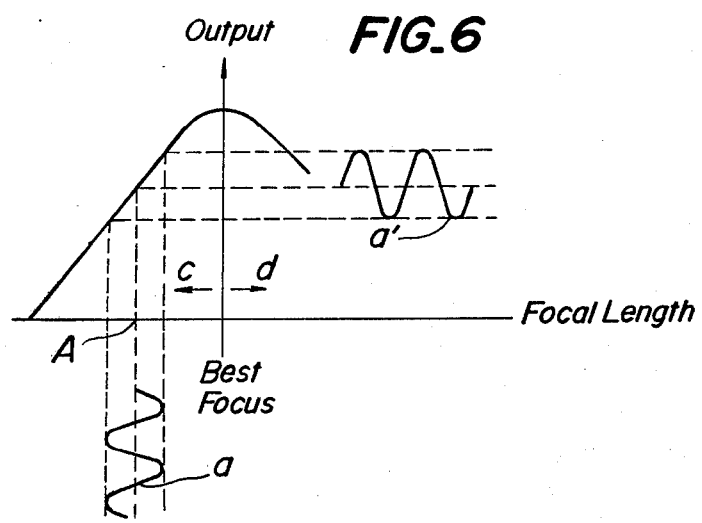
FIG. 6 is an explanatory view showing the relationship between the focal length and the output of the detector circuit.

The output of the differentiating circuit 12 is detected by the detector circuit 13 and voltage-amplified by the amplifier 14. The detector circuit 13 converts an output of the differentiating circuit 12 to a d.c. signal, so that it is necessary to make a time constant sufficiently large, but if the time constant is too large, a response time of control becomes too long, so that it is necessary to set the time constant to an optimum value. FIG. 5 shows waveforms of the outputs of the differentiating circuit 12 and the detector circuit 13. In FIG. 5, (a) is a waveform of the image signal, (b) is an output waveform of the differentiating circuit 12, and (c) is an output waveform of the detector circuit 13. In addition, a relation-ship between the output of the detector circuit 13 and the focal length is shown in FIG. 6. In this case, as explained in the foregoing, the output voltage of the detector circuit 13 becomes the maximum level under the best focal condition, but if the focal length is modulated by a modulating signal of a certain frequency, e.g., if modulation is made under the sine wave condition shown by a waveform a and under the focal condition at the point A in FIG. 6, the same output as the above modulating waveform a as shown by a waveform a' is produced in the detector circuit 13. The modulation of the focal length can be carried out by subjecting the d.c. reversible motor 9 to the so-called vibration i.e. to rotation to both directions with a certain width. This vibration can be obtained as follows. That is, the oscillator 21 generates an output signal which is an original signal of a vibration frequency. This output signal is supplied to one input terminal of the mixer 19 through the d.c. component elimination circuit 20. The d.c. component elimination circuit 20 comprises a capacitor, eliminates a d.c. component of the output of the oscillator 21 and supplies a modulating signal component thereof only to the mixer 19, since if the d.c. component is supplied from the mixer 19 to the d.c. reversible motor 9 which will be explained later on, a torque in one direction is generated in the motor 9 and becomes a cause for generating an offset voltage in a control system and decreases a control precision. The other input terminal of the mixer 19 receives a focusing error voltage (which will be explained later on). Then, the mixer 19 generates an output signal in which an output signal of the oscillator 21 is mixed with the focusing error voltage. This output signal is current-amplified in the current amplifier 24 and supplied to the d.c. reversible motor 9. The motor 9 is then, synchronized with an output signal of the oscillator 21 so as to generate vibration and to modulate the focal length.

Figure 7:
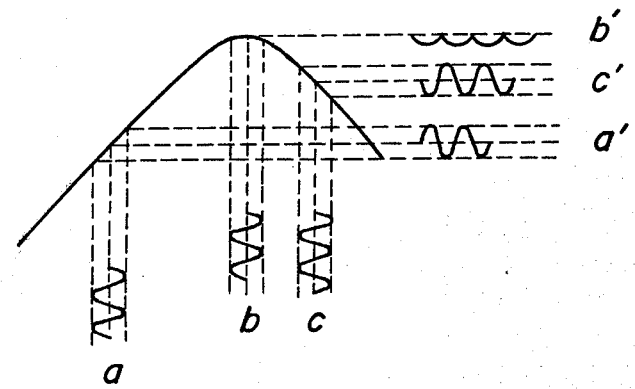
FIG. 7 is an explanatory view showing the relationship between the focal length and the output of the detector circuit under the modulated condition of the focal length.
Figure 8:
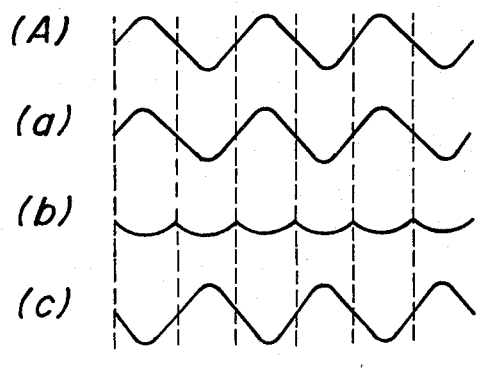
FIG. 8 is a waveform diagram showing the output waveform of the detector circuit under the modulated condition of the focal length.

FIG. 7 shows a relation-ship between the focal length and the output of the detector circuit 13 under the modulated condition of the focal length. That is, as shown in FIG. 7, when the focal length is modulated with a certain frequency and varied to three points a, b and c, the output waveform of the detector circuit 13 becomes waveforms a', b' and c' as shown in FIG. 7. This situation is further explained in detail with reference to FIG. 8. Let the modulating waveform be a (a frequency of this modulating waveform is set within a range being sufficiently followed by the lens assembly 1 and it is usually about 5 Hz) in FIG. 8, the output waveform a' of the detector circuit 13 corresponding to the point a in FIG. 7 becomes a waveform (a) in the same figure, the output waveform c' corresponding to the point c becomes a waveform (c) in the same figure, and the output waveform b' corresponding to the point b (best point of the focal length) becomes a waveform (b) in the same figure. Accordingly, as apparent from FIG. 8, when the focal length is in the region c and the region d in FIG. 6, the output waveforms of the detector circuit 13 are inverted in phase with respect to each other, and when the focal length is at the best point, the output level of the detector circuit 13 is decreased and the frequency component thereof becomes two times the modulating frequency.

Figure 2:
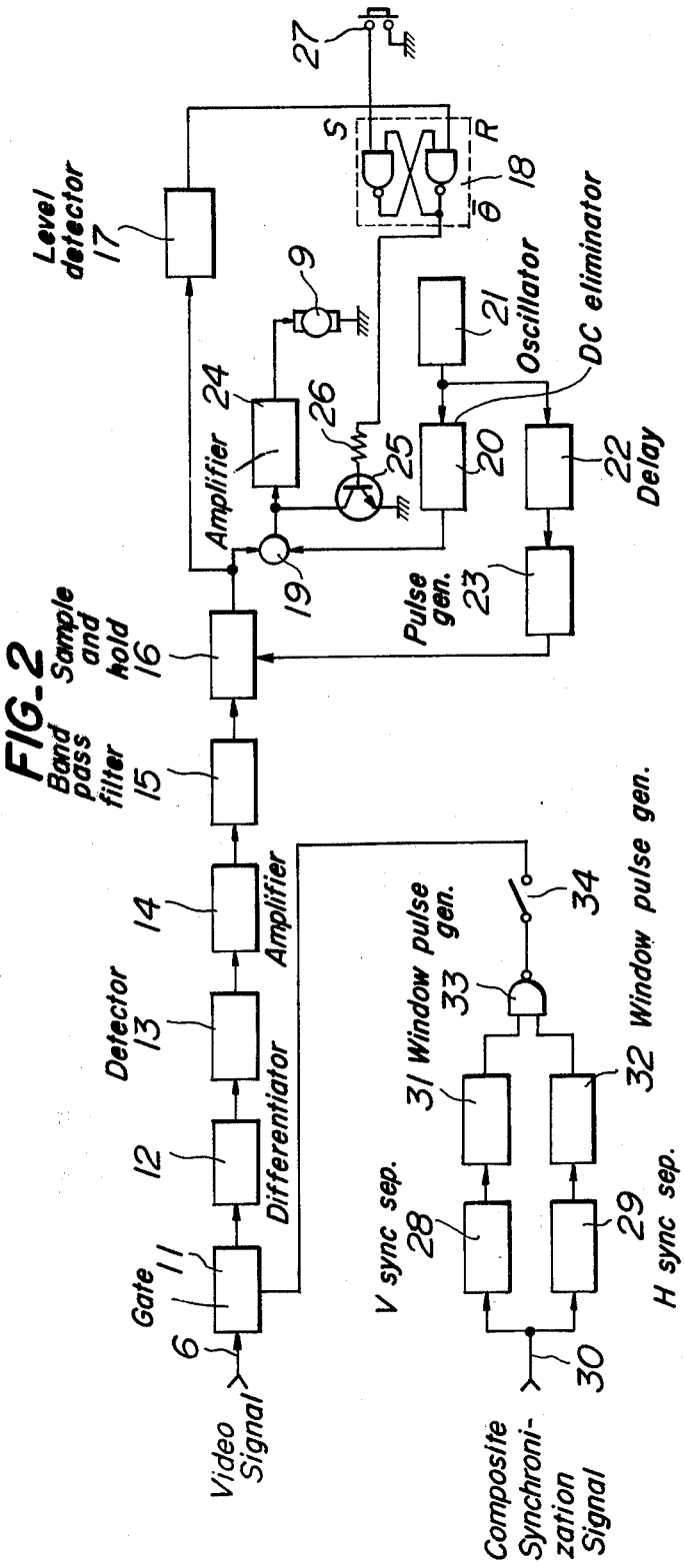
FIG. 2 is a block diagram showing the electric circuit of the automatic focusing control system according to the present invention.
Figure 9:
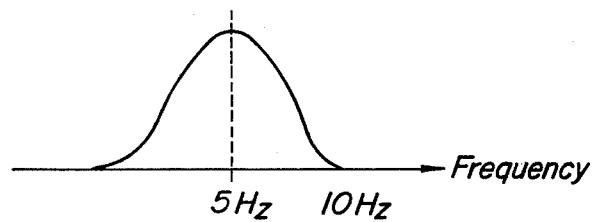
FIG. 9 is an explanatory view showing the characteristic of a filter used in the circuit shown in FIG. 2.

Back to FIG. 2, the output signal of the voltage amplifier 14 is supplied to the band-pass filter 15. The filter 15 has a characteristic for passing through about 5 Hz, which is shown in FIG. 9. In this case, the vicinity of 5 Hz is a pass band, and it is preferable to sufficiently attenuate in the vicinity of 10 Hz.

Figure 10:
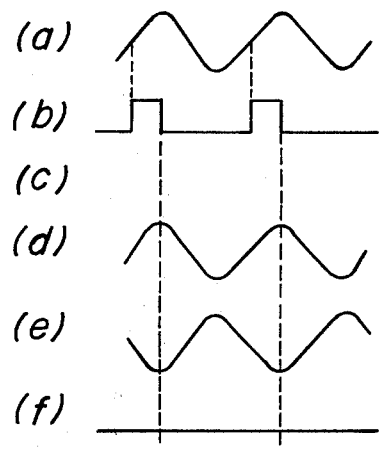
FIG. 10 is an explanatory view showing the operations of the filter an oscillator, a delay circuit and a sampling generator shown in FIG. 2.

The output signal of the band-pass filter 15 is sample-held by the sampling and hold circuit 16. The sampling pulses in this case are formed by the sampling pulse generator 23, and the sampling pulse generator 23 is triggered by the output signal of a delay circuit 22 triggered by the zero-crossing point of a sine wave as an output signal of the oscillator 21. In this case, a delay amount of the delay circuit 22 is set for sampling a changing point (center point between zero-crossing points) of the output of the band-pass filter 15 by sampling pulses. This relation-ship is shown in FIG. 10. In FIG. 10, a waveform (a) is an output waveform of the oscillator 21, a waveform (b) is an output waveform of the delay circuit 22, a waveform (c) is an output i.e., sampling pulse of the sampling pulse generator 23, a waveform (d) is an output waveform of the filter 15 obtained by the output signal of the detector circuit 13 in the region c in FIG. 6 as described above, and a waveform (e) is an output waveform of the filter 15 obtained by the output signal of the detector circuit 13 in the region d in the same manner. As understood from FIG. 10, the sampling pulse (c) can sampling the output of the filter 15, i.e., the changing point of waveform (d) or (e). In FIG. 10, a waveform (f) is an output waveform of the filter 15 obtained by the output of the detector circuit 13 at the best point, and in this case, an output voltage becomes 0V by such filter 15.

As a result, the output of the sampling and hold circuit 16 includes a focusing error signal in proportion to the degree of focus, i.e., an error voltage, and becomes OV when the focus is best. This focusing error voltage is supplied to the mixer 19. Therefore, in the same manner as described in the above, the focusing error voltage is mixed with the modulating signal current-amplified in the current amplifier 24, and supplied to the d.c. reversible motor 9, so that vibration is produced in the motor 9 and the focal length is further modulated. In this case if it is controlled to make the focal error voltage zero by negatively feeding-back a loop system, the best focal length can automatically be obtained.

In the present invention, the focal length is always modulated and this gives a bad influence upon an image signal as a visual flicker. Therefore, the present invention makes the modulation ON and OFF by the transistor 25. That is, when the transistor 25 is under the ON condition, the output signal of the mixer 19 is grounded and the focusing control is stopped. It means that the focusing control is not always necessary, and the focusing is controlled only when the object moved to the direction of the focal length, and after focusing, the control loop is interrupted and deterioration of image quality caused by modulation is prevented. In this case, if a manual switch 27 is ON, the output $\bar{Q}$ of the flip-flop 18 is changed from "1" to "0", and the transistor 25 is made OFF through the resistor 26. Then, the focusing control is started, and when the focus becomes best, the output signal of the sampling and hold circuit 16 becomes close OV. This output signal is thereafter detected by the sensor 17, but if the output signal in this case enters into a threshold set in the sensor 17, the output signal of the sensor 17 is switched from "1" to "0". Then, the flip-flop 18 is reset, the output $\bar{Q}$ is changed from "0" to "1", and the transistor 25 is made ON. As a result, the switch 27 is pushed, the focusing control is started to obtain the best focus, the control loop is simultaneously interrupted, and the best condition is maintained. Thereafter, as far as no instruction is given to the switch 27, no focusing control is carried out.

Figure 11:
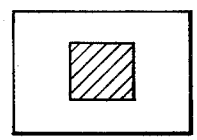
FIG. 11 is an elevational view in section showing the condition in which a part of an image is masked.

On the other hand, the composite synchronizing signal 30 synchronized with the image signal 6 is separated into a vertical synchronizing signal and a horizontal synchronizing signal, respectively, by the vertical synchronizing signal separator 28 and the horizontal synchronizing signal separator 29. Each of the thus separated signals triggers window pulse generators 31 and 32, and each window pulse is given to the AND gate 33. Then, the AND gate 33 generates a signal in which vertical direction and horizontal direction are gated by window pulses, respectively. This signal is supplied to the analog gate 11 through the switch 34. Therefore, when the switch 34 is made ON, a part of the screen can be masked as shown in FIG. 11, and the focus of the image signal on illustrated oblique lines is only controlled. It is a matter of course that the focus of the whole screen can be controlled if the switch 34 is made OFF.

Hence, according to such construction, the best focal length can automatically be obtained in connection with the object, so that time can be saved by a large margin as compared with the prior system in which focusing is adjusted every time when the object moves. Moreover, a precise focal position can be obtained so that a clear image can be obtained. In addition, flicker-like image deterioration caused by modulation can be prevented by automatically stopping modulation simultaneously with the focus control at the best condition.

The present invention is not limited to the above embodiment but can be modified within the range not departing from the essential feature of the invention.

As described above, the present invention can provide an automatic focusing control system which can control the focal length at the best position.

What is claimed is:

1. An automatic focusing control system comprising an optical system, means for modulating a focal length by a modulating signal, means for sensing an output signal corresponding to the focal length from an image signal obtained from the modulating means, means for sensing a focusing error signal from the output signal and the modulating signal, and means for controlling or adjusting the focal length by superimposing the error signal upon the modulating signal.

2. An automatic focusing control system as claimed in claim 1, wherein the means for modulating a focal length by the modulating signal is mechanical means for rotatably driving the optical system by an electric motor.

3. An automatic focusing control system as claimed in claim 1, further comprising means for sensing the best focal length by the focusing error signal and stopping control of the focal length.

4. An automatic focusing control system as claimed in claim 1, further comprising means for carrying out the control of focal length to a part of the image signal.

5. An automatic focusing control system as claimed in claim 2, wherein the optical system is a lens assembly of a camera.

* * * * *